United States Patent [19]
Baltus et al.

[11] Patent Number: 5,887,247
[45] Date of Patent: Mar. 23, 1999

[54] RADIO TRANSMISSION SYSTEM AND A RADIO APPARATUS FOR USE THEREIN

[75] Inventors: Petrus G. M. Baltus; Lukas Leyten; Hendrik A. Visser; Antoon M. H. Tombeur; Antonius G. Wagemans; Jan Van Sinderen, all of Eindhoven, Netherlands

[73] Assignee: U.S. Philips Corporation, New York, N.Y.

[21] Appl. No.: 977,260

[22] Filed: Nov. 24, 1997

Related U.S. Application Data

[63] Continuation of Ser. No. 527,737, Sep. 13, 1995.

[30] Foreign Application Priority Data

Sep. 14, 1994 [EP] European Pat. Off. .............. 94202649

[51] Int. Cl.$^6$ .............................. H04B 17/02; H04B 1/06
[52] U.S. Cl. .......................... 455/277.2; 455/78; 455/135
[58] Field of Search .................... 455/52.3, 65, 132–135, 455/137, 161.1, 161.2, 161.3, 272, 273, 277.1, 277.2, 78, 83

[56] References Cited

U.S. PATENT DOCUMENTS

| | | | |
|---|---|---|---|
| 4,035,728 | 7/1977 | Ishikawa et al. | 455/132 |
| 4,155,041 | 5/1979 | Burns et al. | 455/135 |
| 4,450,585 | 5/1984 | Bell | 455/135 |
| 4,633,519 | 12/1986 | Gotoh et al. | 455/134 |
| 5,203,018 | 4/1993 | Hirose | 455/133 |
| 5,440,590 | 8/1995 | Birchler et al. | 455/135 |
| 5,457,815 | 10/1995 | Morewitze, II | 455/133 |

FOREIGN PATENT DOCUMENTS

| | | |
|---|---|---|
| 0308830 | 3/1989 | European Pat. Off. . |
| 0459038 | 12/1991 | European Pat. Off. . |
| 0610989 | 8/1994 | European Pat. Off. . |

OTHER PUBLICATIONS

Analysis and Design of Analog Integrated Circuits, Second Edition, by Paul R. Gray et al, Wiley and Sons, 1984, pp. 593–600.

Primary Examiner—Reinhard J. Eisenzopf
Assistant Examiner—Sam Bhattacharya

[57] ABSTRACT

A radio transmission system is disclosed for operating in a multipath transmission environment having improved reception, and in the case of bi-directional systems, also improved transmission. This is achieved by using at least two reception beams, corresponding to one fixed reception beam and one scanning reception beam, and by continuously evaluating the quality of these beams as to their signal-to-noise-and-interference ratios or bit-error-rates (BERs). The best beam is dynamically chosen to be the fixed beam. Alternatively, the fixed beam is updated with the best beam acquired by the scanning beam as compared to the current fixed beam. In a bi-directional system, the receiving radio apparatus applies the direction of the best reception beam for transmission to the opposite radio apparatus.

12 Claims, 6 Drawing Sheets

RADIO TRANSMISSION SYSTEM AND A RADIO APPARATUS FOR USE THEREIN

This application is a continuation of 08/527,737 filed Sep. 13, 1995.

BACKGROUND OF THE INVENTION

1. Field of the Invention

The present invention relates to a radio transmission system comprising at least one radio apparatus which comprises a receiving arrangement with at least two receiver front-ends which are coupled to an array of at least two antennas and combining means so as to form beams. Such a system can be a mobile radio system, a cordless telephony system, a paging system, a car radio broadcast system, a GPS (Global Positioning System), an in-house audio link system or home-cast system, wireless headphones, or any other radio transmission system.

The present invention further relates to a radio apparatus for use in such a system.

2. Discussion of the Related Art

A radio transmission system of this kind is known from the European Patent Application EP 0 459 038, in which off-line processing is applied to process signals from a phased-array of antennas for optimising the reception of a desired signal in the presence of interfering signals. In the known system coefficients of tapped delay lines as phase shifting networks are computed and updated so as to find an optimum for a received signal quality. The method as applied in the known system is a complicated brute-force method which is not suitable in environments where reception conditions vary quickly. Such a brute force method is difficult to implement in e.g. a low power portable radio apparatus because a lot of processing capacity is required, requiring considerable battery power. Furthermore, when applying the known method, it cannot be guaranteed that a global optimum is found. In the European patent application EP 0 308 830 another known system is described in which a direction of arrival of incoming radio waves is detected, i.e. the direction of incoming radio waves having the maximum intensity among all the incoming radio waves arriving in all directions. The incoming radio waves are supplied via an array of antennas to a number of receiver front-ends, and via FFT (Fast Fourier Transform) processing means such a maximum intensity direction is determined. By adjusting phase shifters in receiving branches the direction of reception can be changed. In the European Patent Application EP 0 610 989, another known radio transmission is described, in which radio waves are received via at least two antennas. Before the received signals are fed to a receiver, a phase difference between the radio signals as received by the antennas is determined. Such a phase difference contains information as to the direction from which was sent. In EP 0 308 830 and EP 0 610 989 bi-directional transmission systems are described in which radio waves are transmitted in a detected optimum reception direction. The methods applied in the known systems, whether uni-directional or bi-directional, are not optimal for a multipath environment in which signal absorbing or reflecting objects such as buildings or strong interference sources are present in reception paths. When applying the information from the thus determined optimum reception direction in a bi-directional transmission for transmitting in the opposite direction, this could even lead to a transmission in a wrong direction, e.g. into the direction of an interference source or into the direction of an absorbing object so that at the opposite reception side a poor quality signal or no signal at all is received.

SUMMARY OF THE INVENTION

It is an object of the present invention to provide optimum reception in a radio transmission system in which reception conditions vary quickly, and in which multipath radio waves are received.

It is a further object of the present invention to find such an optimum reception direction in such an environment that can be applied as an optimum transmission direction when the system is bidirectional.

To this end the radio transmission system according to the present invention is characterized in that at least one of the receiver front-ends can operate in a beam receiving mode and at least one of the receiver front-ends can operate in a beam scanning mode, that the receiving arrangement comprises best receiving signal determining means for determining a best received signal out of signals in the beam receiving mode and the beam scanning mode on the basis of a quality criterion that takes into account signal-to-noise-and-interference ratios or bit-error-rates of the received signals, and in that the beam in the beam receiving mode is brought in accordance with a better beam found in the beam scanning mode. It is thus achieved that the received beam is a globally optimum beam and is quickly adapted to quickly varying system conditions because of the continuous scanning for a better beam while taking into count noise and interference.

In an embodiment of a radio transmission system according to the present invention the receiving arrangement comprises selection means which are arranged for switching over the receiver front-ends from the beam receiving mode to the beam scanning mode, respectively, when the better beam is found in the beam scanning mode. Herewith the receiver front-ends are switched over.

In another embodiment of a radio transmission system according to the present invention the receiver front-end operating in the beam receiving mode updates its receiving beam to a beam found by the receiver front-end operating in the beam scanning mode, when the better beam is found in the beam scanning mode. Herewith no switching over of the receiver front-ends is required, thus saving switching over means.

In an embodiment of a radio transmission system according to the present invention the receiving arrangement comprises energy measuring means for measuring the noise energy in a predetermined frequency band outside the signal frequency band, the quality criterion being derived from the energy measurement. Herewith, a measure for the signal-to-noise-and-interference ratio of a received signal can be obtained easily. This noise measurement method only applies to systems with angle modulation.

In a further embodiment of a radio transmission system according to the present invention the radio apparatus comprises a transmitting arrangement, which is arranged to transmit a transmit beam in a direction corresponding to a direction of a received beam received in the beam receiving mode. Such a system is a bi-directional system such as a mobile radio system or a cordless telephony system or the like. Due to the combined globally optimum reception, and transmission along the same direction to an opposite radio apparatus, it is achieved that also such a transmission is optimal. Transmission into the wrong direction is avoided, e.g. transmission into the direction of an absorbing object or into the direction of an interference source. Because it is obtained that the transmitted energy is optimally used, less transmission power will be needed for achieving the same system performance as prior systems. Herewith, end-stages of transmitter power amplifiers can more easily be integrated. This is also advantageous in handsets for mobile radio or cordless telephony systems, or the like, for power saving purposes. Alternatively, when not reducing power, larger distances can be bridged between transmitters and receivers.

Further embodiments are claimed in the dependent claims, such as an alternative way of determining the signal-to-noise-and-interference ratios by determining bit-error-rates from demodulated signals, and a receive-transmit switch in a radio apparatus when the system is a bi-directional TDMA (Time Division Multiple Access) or CDMA (Code Division Multiple Access) system.

BRIEF DESCRIPTION OF THE DRAWINGS

The present invention will now be described, by way of example, with reference to the accompanying drawings, wherein FIG. 1 schematically shows a radio transmission system according to the present invention.

Throughout the figures the same reference numerals are used for the same features.

DETAILED DESCRIPTION OF THE PREFERRED EMBODIMENTS

Figure 1:
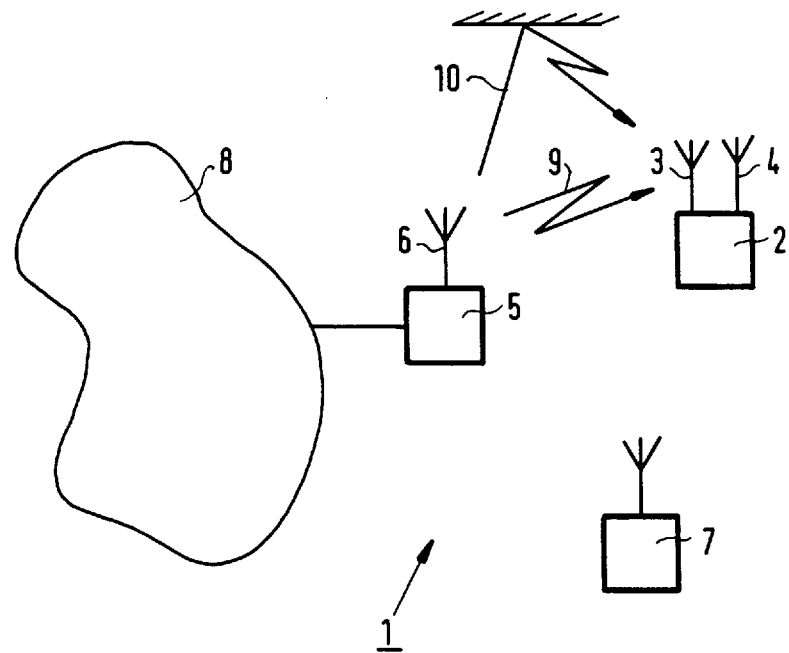

FIG. 1 schematically shows a radio transmission system 1 according to the present invention comprising a radio apparatus 2 having antennas 3 and 4. The system 1 can be an analog or digital transmission system. The radio apparatus 2 can be a car radio apparatus, a paging apparatus, or a GPS device, or the like, the system 1 then being a broadcast system, or the radio apparatus 2 can be a mobile phone or a cordless phone, or the like, the system 1 then being a bi-directional communication system. The system 1 can be any other radio transmission system. In case of a uni-directional or a bidirectional system, respectively, the radio apparatus receives radio signals from, or communicates with a radio apparatus 5, respectively, which broadcast or communicates with an antenna 6, respectively. Further show is a radio apparatus 7. In case of a bi-directional system, e.g. a cordless telephone system, the radio apparatus 5 is a radio base station connected to a public switched telephone network 8, and the radio apparatus 2 is a handset. The antennas 3 and 4 of the radio apparatus 2 receive radio waves 9 and 10 via different paths, i.e. the system represents a multipath transmission environment. In case of car radio, cellular radio, or cordless telephony, such an environment is a quickly changing environment as to received waves.

Figure 2:
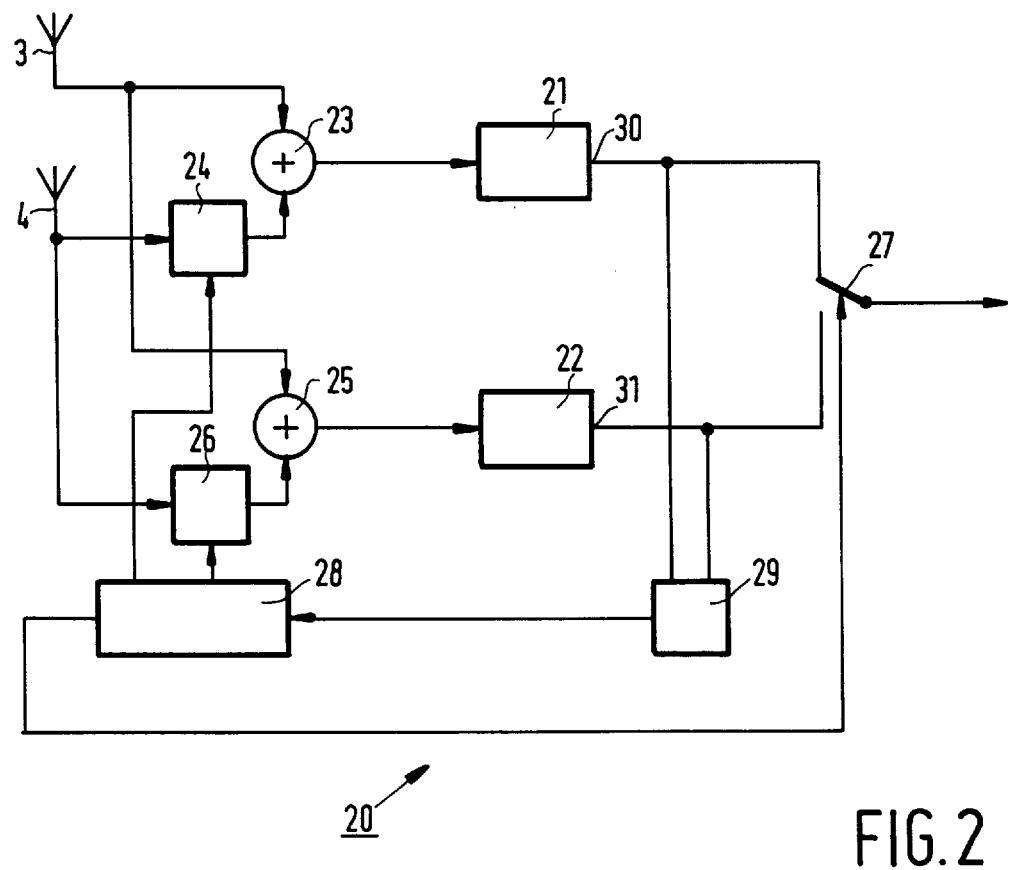
FIG. 2 shows a receiving arrangement in a radio apparatus according to the present invention.

FIG. 2 shows a phased-array receiving arrangement 20 in the radio apparatus 2 according to the present invention, having receiver front ends 21 and 22 which are coupled to a phased-array of the antennas 3 and 4. To this end the antenna 3 is connected to a combiner 23, and the antenna 4 is coupled to the combiner 23 via an adjustable phase shifting arrangement 24, the combiner being coupled to the receiver front-end 21. In the given embodiment, the phased-array and the combiners form a phased antenna array and combining means for forming a beam. This applies for equal gain antenna systems. Alternatively, any combination of phase adjustment and gain adjustment can be applied for beam forming. Similarly, the antennas 3 and 4 are coupled to the receiver front-end 22 via a combiner 25 and an adjustable phase shifting arrangement 26. The phase shifting arrangements 24 and 26 can be a tapped delay line, well-known in the art. Via digital control, such a delay line can be adjusted to various phase shifts (not shown in detail). The delay elements can be coils, pieces of a transmission line, etc. (not shown). As will be described in the sequel, in preferred embodiments of the present invention, the phase shifting will be done after mixing down the received signal. At output side, the receiver front-ends 21 and 22 are coupled to a switch 27 which is controlled by a digital control circuit 28. The receiver front-ends 21 and 22 are switched over from a beam receiving mode to a beam scanning mode, respectively, on the basis of a quality criterion that takes into account e.g. the signal-to-noise-and-interference ratios of the received signals which are determined in a signal quality determining circuit 29 receiving inputs from outputs 30 and 31 of the receiver front-ends 21 and 22, respectively. The receiving beam is switched to the output by means of the receiver front-ends 21 and 22, and the switch 27. According to the present invention, one of the receiver front-ends 21 and 22 is in the beam receiving mode, whereas the other receiver front-end is in the beam scanning mode for continuously searching a better beam. When a better beam is found, the role of the receiver front-ends is interchanged.

Figure 3:
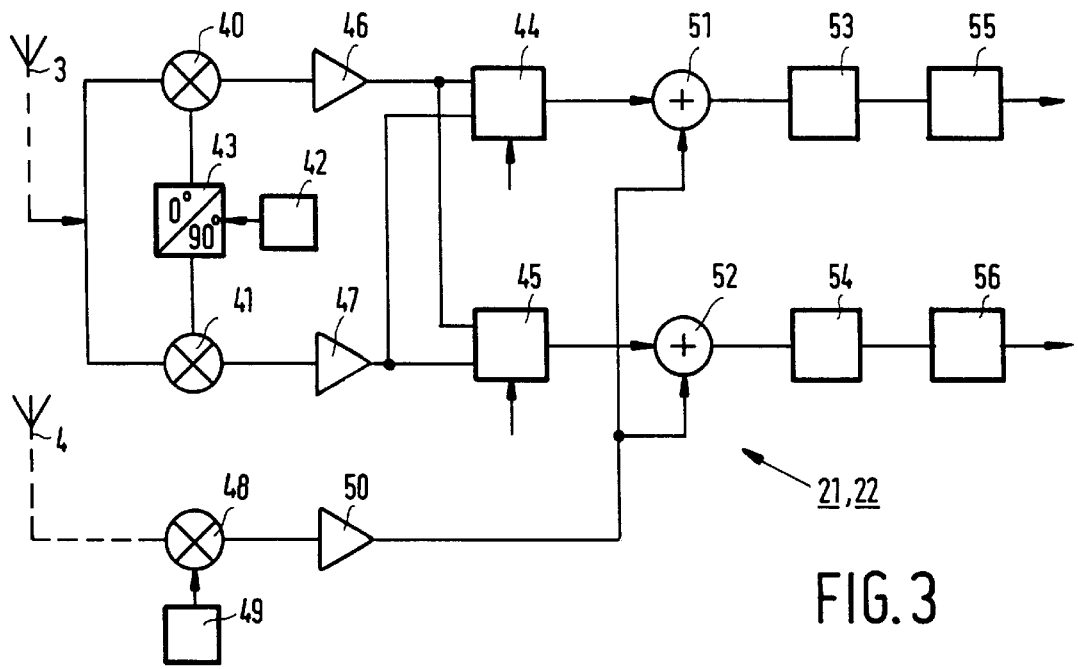
FIG. 3 shows a first embodiment of a receiver front-end in a receiving arrangement according to the present invention.

FIG. 3 shows a first embodiment of the receiver front-ends 21, 22 in the receiving arrangement 20 according to the present invention. In this embodiment, the receiver front-end 21 is a superheterodyne receiver in which the antenna 3 is coupled to mixers 40 and 41 via a bandpass filter (not shown) and a low noise amplifier (not shown). The bandpass filter can be a third order 1.91 GHz bandpass filter, and the receiver front-end, i.e. low noise amplifier and mixer, can be an integrated circuit type UAA2078. The intermediate frequency can be 10 MHz, so that a frequency band can found more easily for noise measurements after demodulation. The mixers 40 and 41 are further coupled to a local oscillator 42 via a phase shifter 43, shifting 0° and 90°, respectively. At output side, the mixers 40 and 41 are coupled to adjustable phase shifter 44 and 45 via amplifiers 46 and 47 respectively. The adjustable phase shifters 44 and 45 are described in more detail in a patent application filed by the same applicant at the same date (European Patent Application Nr.

94202648.5 herewith incorporated by reference). When the phase shifter 44 is adjusted to a predetermined value, and the phase shifter 45 is adjusted to a predetermined scan range, the upper branch, together with a receiver front-end formed by a mixer 48, a local oscillator 49 and an amplifier 50 forms a receiving beam receiver front-end, and similarly the lower branch forms a scanning receiver front-end. When the phase shifters 44 and 45 are adjusted the other way around, the role of the receiver front-ends is interchanged. Further shown are combiners 51, and 52, bandpass filters 53 and 54, and frequency-to-voltage converters 55 and 56 for demodulating the received signals, which are e.g. GMSK signals (digitally modulated Gaussian Minimum Shift Keying). The bandpass filters 53 and 54 can be 4th order Bessel bandpass filters at e.g. 10.64 MHz. The frequency-to-voltage converters 55 and 56 can be PLL (phase lock loop) demodulators, or frequency discriminators, both being well-known in the art.

Figure 4:
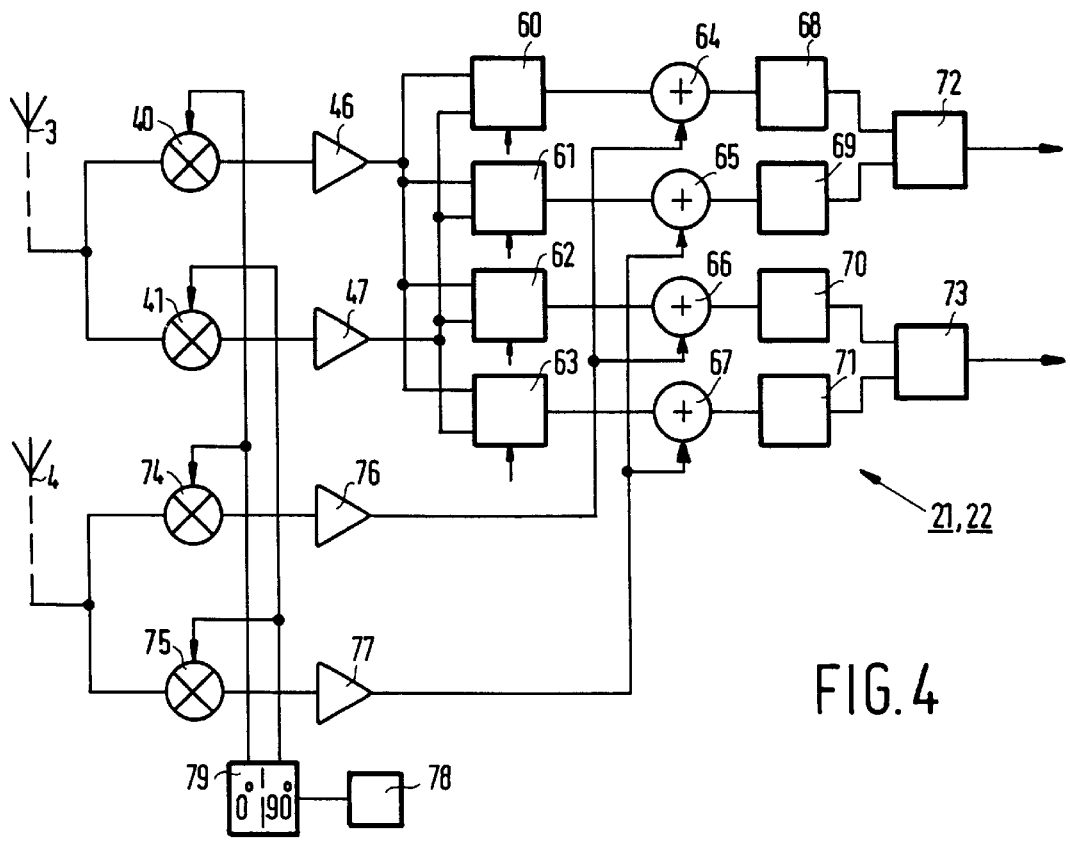
FIG. 4 shows a second embodiment of a receiver front-end in a receiving arrangement according to the present invention.

FIG. 4 shows a second embodiment of the receiver front-ends 21 and 22 in a receiving arrangement 20 according to the present invention. In this embodiment, the receiving arrangement is a so-called zero-IF (Intermediate Frequency) or low-IF receiver. The antenna 3 is coupled to a first quadrature receiver front-end branch in which the amplifier 46 is coupled to first inputs of adjustable phase shifters 60, 61, 62 and 63, and in which the amplifier 47 is coupled to second inputs of the adjustable phase shifters 60, 61, 62, and 63. The phase shifters 60 and 61 are adjusted to a first phase angle, and to the first phase angle minus 90°, and the phase shifters 62 and 63 are adjusted to a second phase angle, and to the second phase angle minus 90°, this being necessary for retaining quadrature signals for a zero-IF demodulator. At output side, the phase shifters are coupled to combiners 64, 65, 66, and 67, respectively, which are coupled at output side to filters 68, 69, 70, and 71, respectively. The filters 68 and 69 are coupled to a frequency-to-voltage converter 72 so as to form a first demodulated output signal, and the filters 70 and 71 are coupled to a frequency-to-voltage converter 73 so as to form a second demodulated output signal. The antenna 4 is coupled to a second quadrature receiver front-end branch formed by mixers 74 and 75, and amplifiers 76 and 77. Further shown is a local oscillator 78 which is coupled to a phase shifter 79 for coupling the local oscillator 78 to the mixers 40 and 74 with a 0° phase shift, and for coupling the local oscillator 78 to the mixers 41 and 75 with a 90° phase shift. The receiving beam and scanning beam receiver front-ends 21 and 22, and vice versa, are formed in a similar way as described with respect to FIG. 3. A variant to a zero-IF receiver is an image reject receiver. In such a receiver less stringent requirements are to be imposed upon the bandpass filters at antenna sides, but some extra hardware is included before the filters 68 to 71, such as an additional phase shifter and combiner. Such an image reject receiver is well-known in the art, and not further shown in detail.

Figure 5:
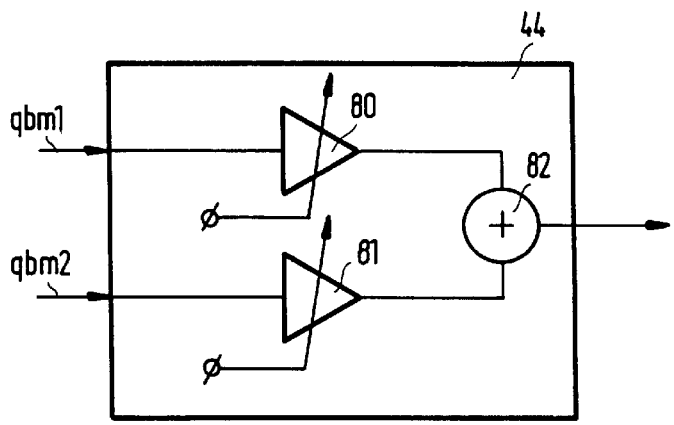
FIG. 5 shows a phase shifting arrangement for use in a radio apparatus according to the present invention.

FIG. 5 shows the phase shifting arrangements 44, 45, 60, 61, 62, and 63 for use in the radio apparatus 2 according to the present invention, comprising adjustable amplifiers 80 and 81, of which outputs are coupled to a combiner 82. By amplifying quadrature signals with different amplification factors, respectively, the phase of the quadrature signal can be adjusted. The amplifiers 80 and 81 can be so-called Gilbert cells such as described in the handbook "Analysis and Design of Analog Integrated Circuits", P. R. Gray and R. G. Meyer, Wiley & Sons, 1984, pp. 593–600. Such a Gilbert cell can be used as an analog multiplier. As is shown on pages 599–600 of said handbook, an output voltage is proportional to the product of two input voltages, so, by choosing one of the input voltage of the Gilbert cell to be the input voltage of the amplifier 80, and the other input voltage of the Gilbert cell to be the adjustment voltage, a DC voltage, an adjustable amplifier is obtained.

Figure 6:
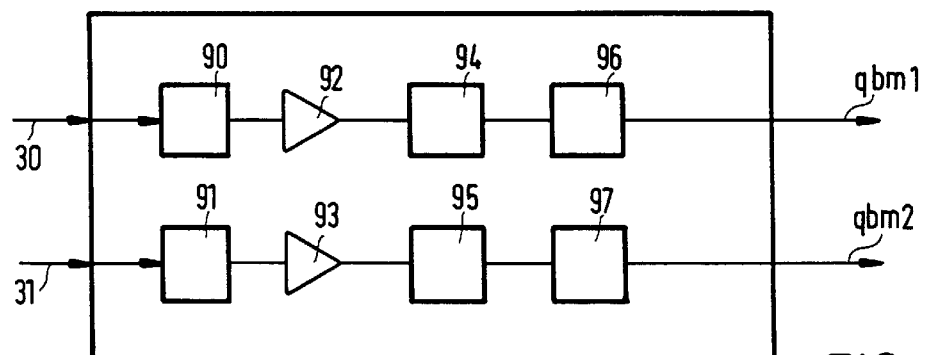
FIG. 6 shows a signal quality determining circuit according to the present invention.

FIG. 6 shows the signal quality determining circuit 29 according to the present invention, which takes into account the signal-to-noise-and-interference ratios of the received signals, either the signals in beam receiving mode or the signals in beam scanning mode. The circuit 29 determines the quality of the demodulated signal, i.e. the signal-to-noise-and-interference ratios, e.g. on the basis of noise measurements or on the basis of BER (Bit Error Rates) measurements. The latter method applies a microcontroller (not shown), such a microcontroller comprising a RAM-memory, a ROM-memory, and analog and digital I/O-interfaces such as analog-to-digital converters, digital-to-analog converters, and binary I/O-interfaces. The noise measurement method will be described in more detail in the sequel. The circuit 29 comprises two branches for the receiving beam and for the scanning beam, respectively, in which signal qualities qbm1 and qbm2 are determined. The two branches comprise bandpass filters 90 and 91, amplifiers 92 and 93, non-linear elements 94 and 95, e.g. a rectifier diode followed by a capacitor (not shown) so as to form a peak-detector, and low pass filters 96 and 97, respectively. This method can only be applied to angle modulated systems. The bandpass filters 90 and 91 select noise and distortion. The non-linear elements 94 and 95 provide signal levels of the signals selected by the bandpass filters 90 and 91.

Figure 7A:
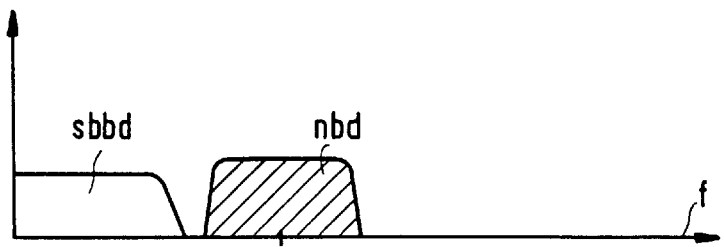
FIGS. 7a and 7b show signals in the frequency domain for illustrating the operation of the quality determining circuit.
Figure 7B:
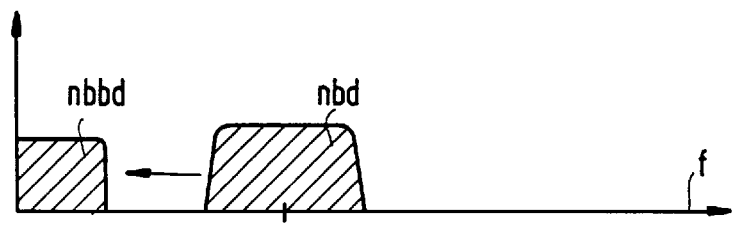

FIG. 7 shows signals in the frequency domain for illustrating the operation of the quality determining circuit 29. In FIG. 7A, a signal baseband sbbd is shown outside a noiseband nbd. The circuit 29 determines the noise energy outside the signal baseband sbbd by bandpass filtering, rectification, and integration, as described. E.g. with FM signals, this noise energy is a good measure for the signal-to-noise-and-interference ratio. FIG. 7B shows down-conversion of the noiseband signal nbd to a noise baseband signal nbbd.

Figure 8:
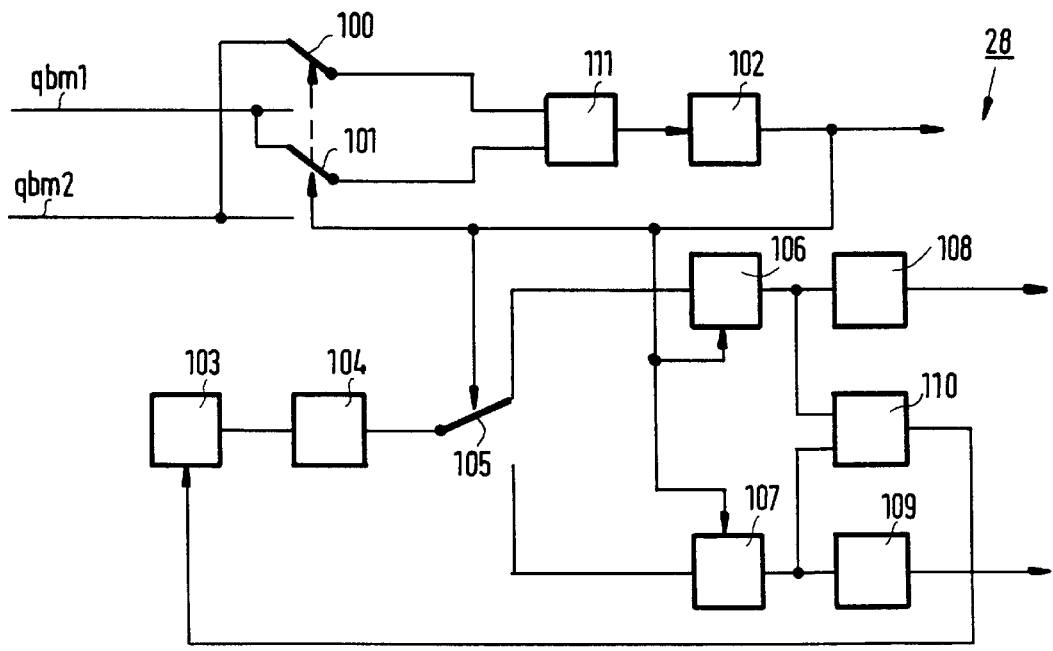
FIG. 8 shows a control circuit for controlling the receiving arrangement.

FIG. 8 shows the digital control circuit 28 for controlling the receiving arrangement 20. The control circuit 28 comprises switches 100 and 101 for interchanging receiving beam and scanning beam. If the quality of the scanning beam exceeds the quality of the receiving or fixed beam, a comparator 111 with hysteresis will supply a pulse at its output, this pulse toggling a flip-flop circuit 102. The circuit 29 further comprises scanning means in the form of a clock 103 coupled to a counter 104. A counter output is used for controlling scanning. To this end, the counter 104 is coupled to the phase shifters 44 and 45, or to the phase shifters 60, and 61, and 62, and 63, respectively, via a change-over switch 105, and via latches 106 and 107, and address-to-voltage converters 108 and 109, respectively. The flip-flop circuit 102 controls the switches 100, 101, and 105, and the latches 106 and 107 of which outputs are coupled to a comparator 110. At output side, the comparator 110 is coupled to the clock 103. The flip-flop toggle pulse locks the address of the scanning beam in its latch while at the same time the address of the counter is supplied to the address-to-voltage converter of the other beam. Herewith, the currently scanning beam becomes the fixed beam, at the determined best scanning beam, and the fixed beam becomes scanning beam. The comparator 110 forces the scanning beam to skip the direction of the current fixed beam. The choice of the clock frequency of the clock 103 depends on the actual environment the system is working in. E.g. a cellular radio environment would require faster electronics than an cordless telephony office environment. The more counter steps, the more directions can be scanned. Instead of address-to-voltage-converters, a microcontroller and a lookup-table can be applied for transforming a spatial phase angle of a scanning beam to an electrical phase angle, the lookup-table comprising a predetermined mathematical relationship between the spatial and electrical phase angle.

Figure 9:
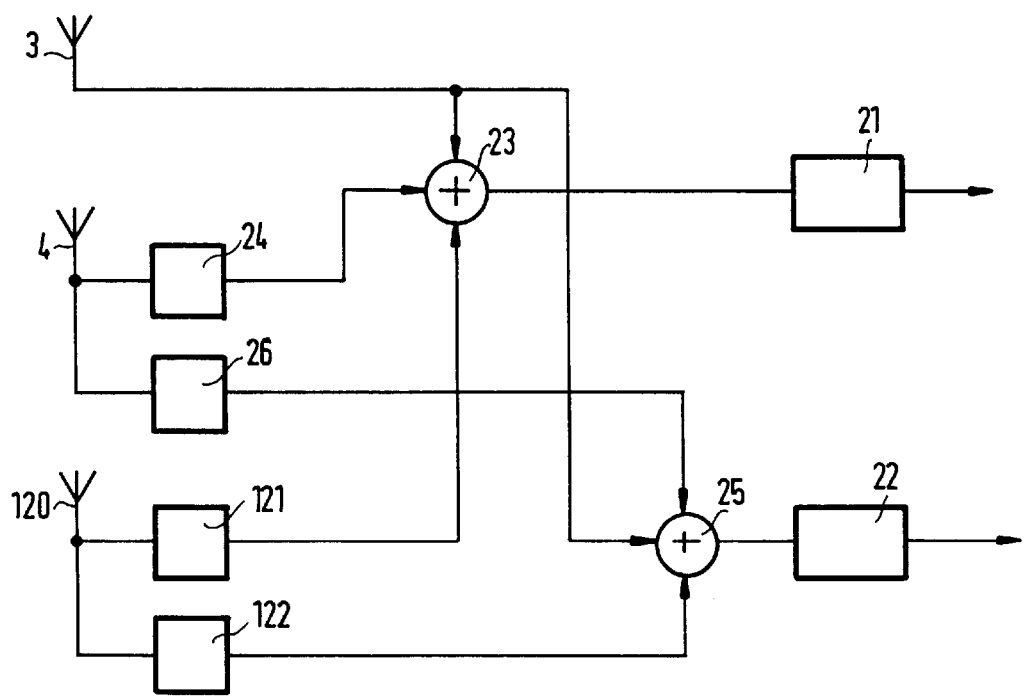
FIG. 9 shows a three antenna arrangement coupled to two receiver front-ends in a receiving arrangement according to the present invention.

FIG. 9 shows a three antenna arrangement coupled to the two receiver front-ends 21 and 22 in the receiving arrangement 20 according to the present invention, in which an additional antenna 120 is applied. The antenna 120 is coupled to the combiners 23 and 25 via additional phase shifters 121 and 122, the combiners 23 and 25 having an additional input as compared with FIG. 2. Such a structure can be generalised to a structure having n antennas and a corresponding number of phase shifters to generate one receiving beam and one scanning beam.

Figure 10:
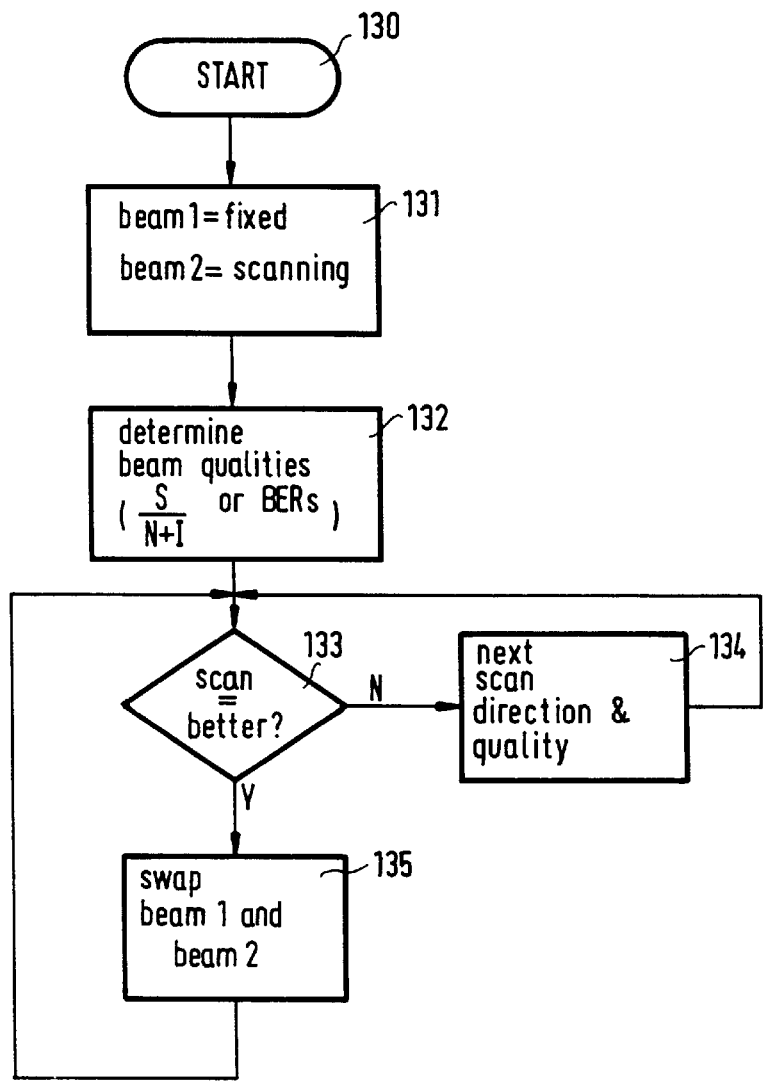
FIG. 10 shows a flow chart to illustrate control of the receiving arrangement.

FIG. 10 shows a flow chart to illustrate control of the receiving arrangement 20. The flow chart describes a software implementation of at least a part of the present invention, a controller, as described, being coupled to the receiving arrangement 20. In block 130, having label START, beam quality determination/scanning starts. In block 131, beam1 of receiver front-end 21 is fixed, and beam2 of receiver front-end 22 is scanning. In block 132, beam qualities are determined, e.g. on the basis of signal-to-noise-and-interference ratios (S/(N+I)) or on the basis of the BERs (Bit Error Rates). In testblock 133, it is tested which of the two beams is better. If the scanning beam is not better, in block 134 a next scanning direction is determined and adjusted, and the quality of this next scan direction is determined. If the scanning beam is better, in block 135, the role of the fixed and scanning beams are interchanged, i.e. the receiver front-ends are changed-over or swapped. Alternatively, the beam1 is updated with the better beam found during scanning. Then, no changing-over or swapping is necessary.

Figure 11:
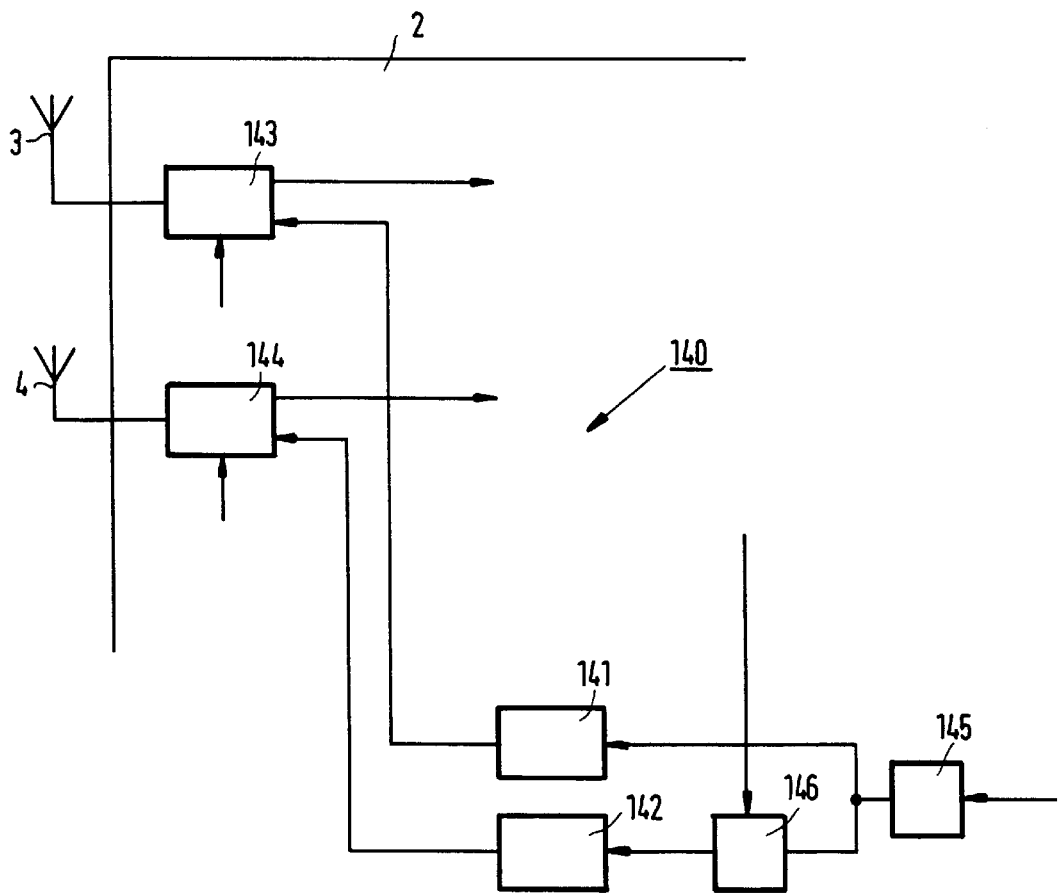
FIG. 11 shows a transmitting arrangement in a radio apparatus according to the present invention.

FIG. 11 shows a transmitting arrangement 140 in the radio apparatus 2 according to the present invention, comprising two back-ends 141 and 142 which are coupled to the antennas 3 and 4 via receive-transmit switching arrangements 143 and 144, respectively. E.g., when the radio apparatus is a cordless telephone according to the DECT (Digital European Cordless Telecommunications) Standard, describing a TDMA digital cordless telephony Standard, the switching arrangements 143 and 144 can switch over the radio apparatus from receive mode to transmit mode at a frequency of 100 Hz. The back ends 141 and 142 are coupled to a GMSK-modulator 145, an adjustable phase shifter 146 being coupled between an output of the GMSK-modulator 145 and the back-end 142. The phase shifter 146 is dynamically loaded with the phase shift of the fixed beam phase shift. It is thus achieved that the radio apparatus 2 also transmits into the best direction, i.e. absorbing objects are avoided, and also wrong transmission into the direction of strong interference sources takes place. This idea is based upon the insight that a transmission path is reciprocal as to a reception or transmission direction.

Figure 12:
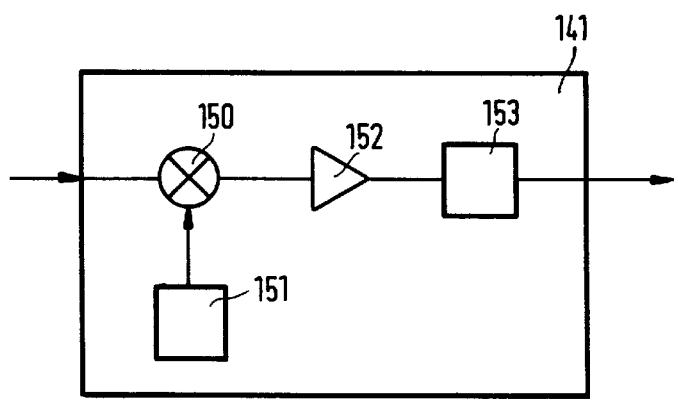
FIG. 12 shows a back-end in a transmitting arrangement.

FIG. 12 shows the back-end 141 in the transmitting arrangement 140, comprising a mixer 150 coupled to a local oscillator 151, and to a power amplifier 152, which is coupled at output side to a transmit filter 153.

Figure 13:
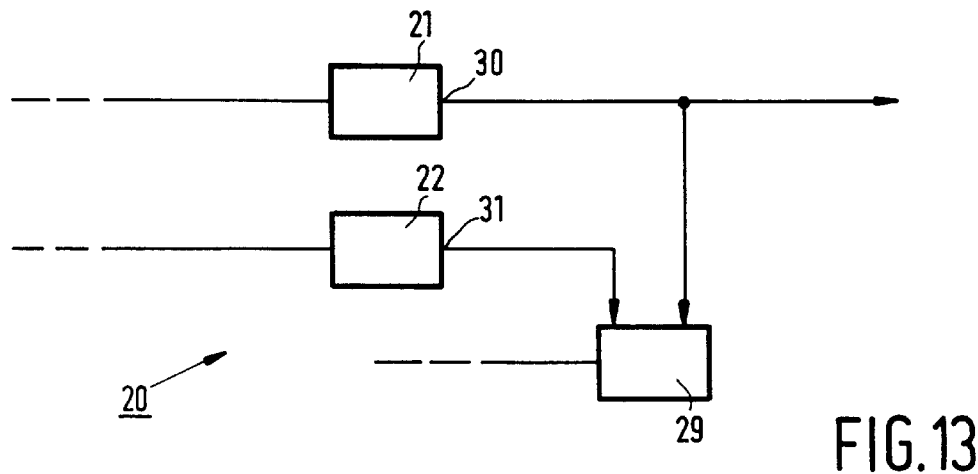
FIG. 13 shows an alternative receiving arrangement.

FIG. 13 shows an alternative receiving arrangement 20, in which the receiver front-end 21 is continuously operating in the beam receiving mode and the receiver front end 22 is continuously operating in the beam scanning mode. When a better beam is found by the receiver front-end 22, the receiver front-end 21 updates its receiving beam.

Instead of the shown two beam system having two receiver front-ends and one receiving beam and one scanning beam, the principles of the present invention can easily be extended to an n antenna/m beam system, n and m being integers. k out of the m beams can be fixed beams and (m−k) beams can be scanning beams, then. When transmitting, the best beam among the received fixed beams will be selected.

We claim:

1. A radio transmission system comprising at least one radio apparatus which comprises a phased-array receiving arrangement, wherein the phased-array receiving arrangement comprises at least two receiver front-ends which are coupled to an array of at least two antennas and means for combining signals received by the array of at least two antennas so as to form at least two beams, each of said beams corresponding to a receiving direction controlled by a phase shifter, wherein at least one of the receiver front-ends operates in a beam receiving mode and at least one of the receiver front-ends operates in a beam scanning mode, wherein the receiving arrangement further comprises best receiving signal determining means for determining a best received signal out of all received signals produced by said receiver front-ends on the basis of a quality criterion that takes into account signal-to-noise-and-interference ratios or bit-error rates (BERs) of the received signals, and further wherein a beam in the beam receiving mode is interchanged with a beam in the beam scanning mode in accordance with a better beam found in the beam scanning mode.

2. The radio transmission system as claimed in claim 1, further wherein the receiving arrangement comprises selection means for switching over the receiver front-ends from the beam receiving mode to the beam scanning mode, respectively, when the better beam is found in the beam scanning mode.

3. The radio transmission system as claimed in claim 1, further wherein the receiver front-end operating in the beam receiving mode updates its receiving beam to a beam found by the receiver front-end operating in the beam scanning mode, when the better beam is found in the beam scanning mode.

4. The radio transmission system according to claim 1, wherein the receiving arrangement further comprises energy measuring means for measuring a noise energy in a predetermined frequency band outside a signal frequency band, the quality criterion being derived from an energy measurement.

5. The radio transmission system according to claim 4, wherein the radio apparatus further comprises a receive-transmit switching arrangement for periodically switching over the antennas from a receive mode to a transmit mode.

6. The radio transmission system according to claim 1, wherein the receiving arrangement further comprises demodulator means for demodulating output signals of the receiver front-ends, and processing means for determining bit-error-rates (BERs) from demodulated signals over a predetermined time interval, the quality citerion being based on a bit-error-rate.

7. A radio transmission system comprising at least one radio apparatus which comprises a receiving arrangement, the receiving arrangement comprises at least two receiver front-ends which are coupled to an array of at least two antennas and means for combining signals received by the array of at least two antennas so as to form at least two beams, at least one of the receiver front-ends operates in a beam receiving mode and at least one of the receiver front-ends operates in a beam scanning mode, the receiving arrangement further comprises best receiving signal determining means for determining a best received signal out of signals in the beam receiving mode and the beam scanning mode on the basis of a quality criterion that takes into account signal-to-noise-and-interference ratios or bit-error rates (BERs) of the received signals, and wherein a beam in the beam receiving mode is interchanged with a beam in the beam scanning mode in accordance with a better beam found in the beam scanning mode, and wherein the radio apparatus further comprises a transmitting arrangement, the transmitting arrangement being arranged to transmit a transmit beam in a direction corresponding to a direction of a received beam received in a beam receiving mode.

8. A radio apparatus for use in a radio transmission system, said radio apparatus comprising:

at least two receiver front ends coupled to an array of at least two antennas and means for combining signals received by the array of at least two antennas so as to form at least two beams, wherein at least one of the receiver front-ends operates in a beam receiving mode and at least one of the receiver front-ends operates in a beam scanning mode;

best receiving signal determining means for determining a best received signal out of signals in the beam receiving mode and the beam scanning mode on the basis of a quality criterion that takes into account signal-to-noise-and-interference ratios or bit-error rates (BERs) of the received signals, and further wherein a receiver front-end operating in the beam receiving mode updates its beam when a better beam is found by the receiver front-end operating in the beam scanning mode; and a transmitting arrangement, the transmitting arrangement being arranged to transmit a transmit beam in a direction corresponding to a direction of a received beam received in a beam receiving mode.

9. A radio apparatus for use in a radio transmission system, the radio apparatus comprising:

at least two antennas;

a first adjustable phase shifter and first combiner for combining signals received by the antennas so as to form a first received beam having a receiving direction controlled by the first phase shifter;

a second adjustable phase shifter and second combiner for combining signals received by the antennas so as to form a second received beam having a receiving direction controlled by the second phase shifter;

a first receiver front end for processing the first received beam to produce a first received signal;

a second receiver front end for processing the second received beam to produce a second received signal;

control means for the first and second phase shifters to operate one of the receiver front-ends in a beam receiving mode in which the received beam of said one receiver front-end does not scan in receiving direction and to simultaneously operate the other one of the receiver front-ends in a beam scanning mode in which the received beam of said other receiver front-end does scan in receiving direction; and a best received signal determining means for determining whether the first received signal or the second received signal is a best received signal, said control means being responsive to said best received signal determining means to control the first and second phase shifters so that when said other receiver front-end in the beam scanning mode produces the best received signal, said other receiver front-end is switched to the beam receiving mode and said one receiver front-end is switched to the beam scanning mode.

10. A radio apparatus as claimed in claim 9, wherein the best signal determining means determines the best received signal on the basis of a quality criterion that takes into account signal-to-noise-and-interference ratios or bit-error rates (BERs) of the first and second received signals.

11. A radio apparatus for use in a radio transmission system, the radio apparatus comprising:

at least two antennas;

a first adjustable phase shifter and first combiner for combining signals received by the antennas so as to form a first received beam having a receiving direction controlled by the first phase shift;

a second adjustable phase shifter and second combiner for combining signals received by the antennas so as to form a second received beam having a receiving direction controlled by the second phase shifter;

a first receiver front end for processing the first received beam to produce a first received signal;

a second receiver front end for processing the second received beam to produce a second received signal;

control means for the first and second phase shifters to operate the first receiver front-end in a beam receiving mode in which the received beam of the first receiver front-end does not scan in receiving direction and to simultaneously operate the second receiver front-end in a beam scanning mode in which the received beam of said second receiver front-end does scan in receiving direction; and a best received signal determining means for determining whether the first received signal or the second received signal is a best received signal, said control means being responsive to said best received signal determining means to control the first and second phase shifters so that when the second receiver front-end in the beam scanning mode produces the best received signal, the receiving direction of the received beam of the first receiver front-end is corrected to match the receiving direction of the received beam of the second receiver front-end.

12. A radio apparatus as claimed in claim 11, wherein the best signal determining means determines the best received signal on the basis of a quality criterion that takes into account signal-to-noise-and-interference ratios or bit-error rates (BERs) of the first and second received signals.

* * * * *